US011474967B2

(12) United States Patent
Kopzon et al.

(10) Patent No.: US 11,474,967 B2
(45) Date of Patent: Oct. 18, 2022

(54) SYSTEMS, METHODS, AND DEVICES FOR DYNAMIC HIGH SPEED LANE DIRECTION SWITCHING FOR ASYMMETRICAL INTERFACES

(71) Applicant: Intel Corporation, Santa Clara, CA (US)

(72) Inventors: Vladislav Kopzon, Haifa (IL); Reuven Rozic, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 865 days.

(21) Appl. No.: 16/017,481

(22) Filed: Jun. 25, 2018

(65) Prior Publication Data
US 2019/0050365 A1 Feb. 14, 2019

(51) Int. Cl.
*G06F 13/42* (2006.01)
(52) U.S. Cl.
CPC .. *G06F 13/4282* (2013.01); *G06F 2213/0026* (2013.01); *G06F 2213/0042* (2013.01)
(58) Field of Classification Search
CPC ......... G06F 13/4282; G06F 2213/0026; G06F 2213/0042
See application file for complete search history.

(56) References Cited

U.S. PATENT DOCUMENTS

| | | | |
|---|---|---|---|
| 7,469,311 B1 * | 12/2008 | Tsu | G06F 13/4018 710/307 |
| 2007/0150762 A1 | 6/2007 | Sharma et al. | |
| 2011/0106989 A1 * | 5/2011 | Solomon | G06F 13/102 710/63 |
| 2012/0191921 A1 * | 7/2012 | Shaeffer | G06F 1/3275 710/316 |
| 2016/0179718 A1 * | 6/2016 | Morris | G06F 13/28 710/308 |
| 2016/0283112 A1 * | 9/2016 | Blankenship | G06F 3/0671 |

* cited by examiner

*Primary Examiner* — Henry Tsai
*Assistant Examiner* — Harry Z Wang
(74) *Attorney, Agent, or Firm* — Alliance IP, LLC

(57) ABSTRACT

Systems, devices, computer program products, and methods include determining by a connection manager that a connected device can be enhanced by an asymmetrical multi-lane link. The connection manager can use system parameters, including bandwidth information, to switch a direction of one or more lanes of the multi-lane link. The connection manager can use register setting instructions to change register settings on the host side and on the device side to switch the direction of one or more lanes of the multi-lane link.

23 Claims, 11 Drawing Sheets

SYSTEMS, METHODS, AND DEVICES FOR DYNAMIC HIGH SPEED LANE DIRECTION SWITCHING FOR ASYMMETRICAL INTERFACES

BACKGROUND

Interconnects can be used to provide communication between different devices within a system, some type of interconnect mechanism is used. One typical communication protocol for communications interconnects between devices in a computer system is a Peripheral Component Interconnect Express (PCI Express™ (PCIe™)) communication protocol. This communication protocol is one example of a load/store input/output (I/O) interconnect system. The communication between the devices is typically performed serially according to this protocol at very high speeds.

DETAILED DESCRIPTION

Figure 1:
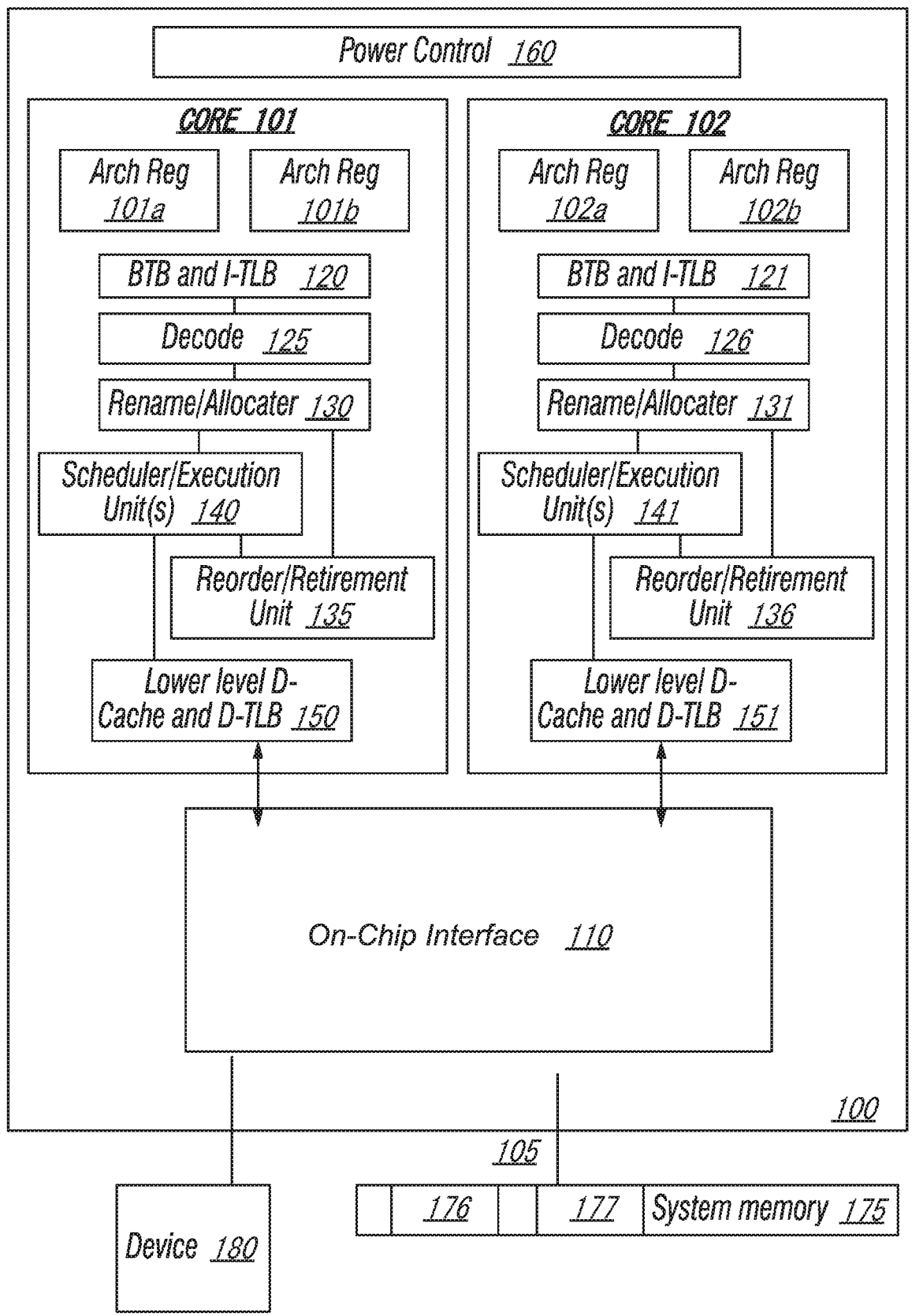
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

PCIe supports hot plug functionality, but can lack a consistent way to report certain key bits of information to system software, making it difficult for PCIe subsystems to be managed optimally, and leading to system limitations and poor user experiences. These same limitations affect Converged Input/Output (CIO) or "open" Thunderbolt because these I/O configurations use PCIe as a tunneled I/O architecture.

CIO is a tunnel for PCIe and DisplayPort. A CIO link can be of a single lane or two lanes aggregated, running at 10

Gbps to 40 Gbps, or beyond. CIO can operate across a USB Type-C connector (as an alternate mode) and enables PCIe devices outside of the system box.

In some computing systems, with interfaces that allow multiple protocols to coexist, many applications use asymmetrical bandwidth allocation. In some cases, outbound (or downstream) bandwidth is greater than inbound (or upstream) bandwidth, such as in display applications where data is transmitted from a central processing system to a display device, such as a monitor. In some cases, the upstream bandwidth is greater than the downstream bandwidth. When the total bandwidth of the I/O interface is limited, certain lanes are underutilized, while others are oversubscribed. This disclosure describes dynamically switching between a symmetric interface to an asymmetric interface without impacting current traffic. The systems, methods, and devices described herein can keep the flow of events intact and can use available bandwidth pathways, without impacting the user experience.

Figure 2:
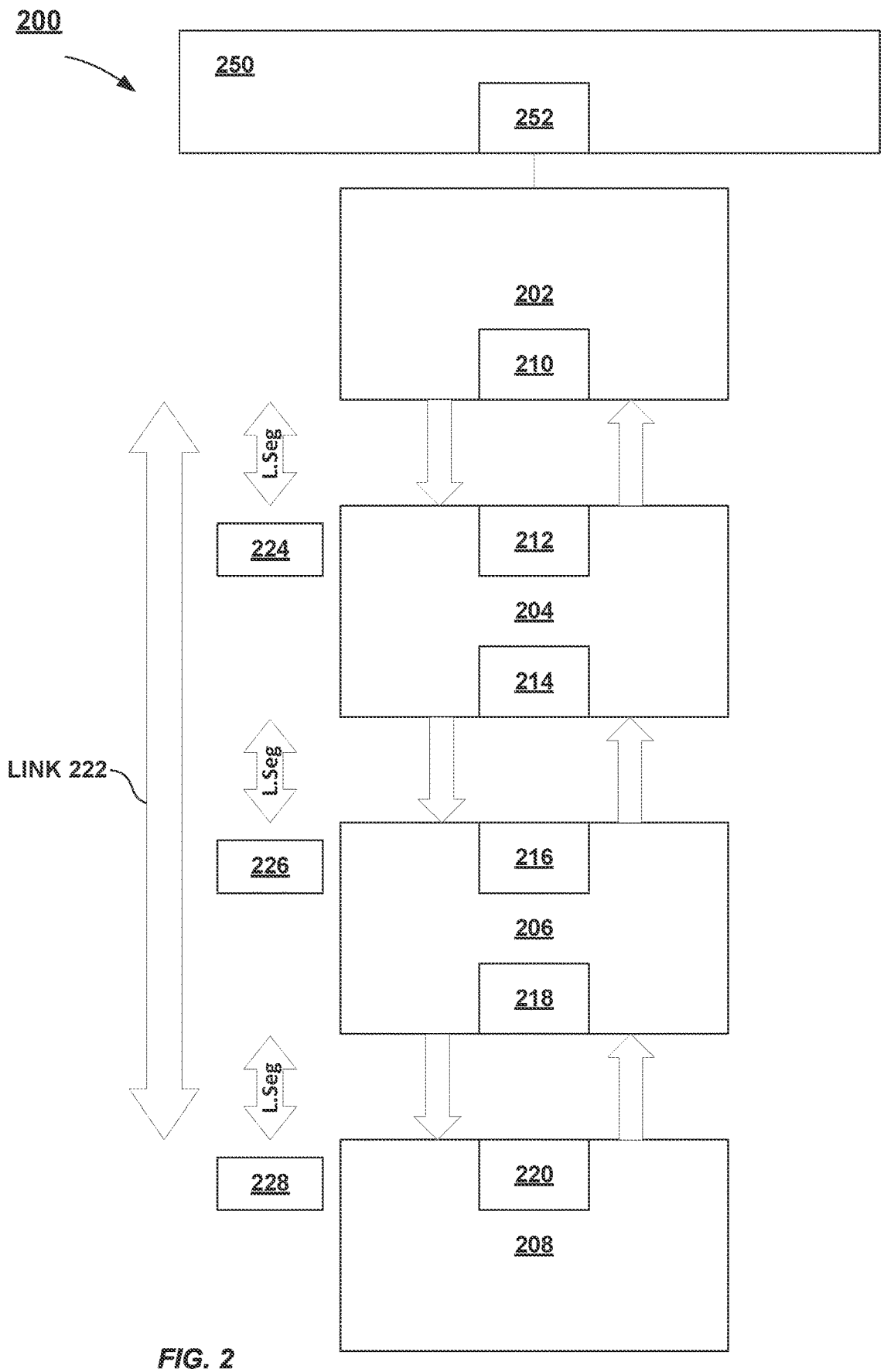
FIG. 2 is a schematic diagram of an example peripheral component interconnect express (PCIe) link architecture in accordance with embodiments of the present disclosure.

FIG. 2 is a schematic diagram of an example peripheral component interconnect express (PCIe) link architecture 200 in accordance with embodiments of the present disclosure. The PCIe link architecture 200 includes a first component 202, which can be an upstream component, root complex, or switch compliant with the PCIe protocol. The first component 202 can include a downstream port 210 that facilitates communications with upstream components across a link 222, such as a link compliant with the PCIe protocol. The first component 202 can be coupled to a second component 208, which can be a downstream component, endpoint, or switch compliant with the PCIe protocol. In some embodiments, the first component can be linked to one or more intermediate components, such as first retimer 204 and second retimer 206, for example.

In embodiments, the first component 202 can include a downstream port 210 to facilitate downstream communications (e.g., towards the second component 208) with the second component 208 (if directly connected) or with the upstream (pseudo) port 212 of retimer 204. The second component 208 can include an upstream port 220 to facilitate upstream communications (e.g., towards the first component 202) with the first component 202 (if directly connected) or with the downstream (pseudo) port 212 of retimer 204.

In the example shown in FIG. 2, the first component 202 can be linked to a first retimer 204 by a first link segment 224. Likewise, the first retimer 204 can be linked to a second retimer 206 by a link segment 226. The second retimer 206 can be linked to the second component 208 by a link segment 228. Link segments 224, 226, and 228 can make up all or a portion of link 222.

The link 222 can facilitate upstream and downstream communications between the first component 202 and the second component 208. In embodiments, upstream communications refers to data and control information transmitted from the second component 208 towards the first component 202; and downstream communications refers to data and control information transmitted from the first component 202 towards the second component 208. As mentioned above, one or more retimers (e.g., retimers 204 and 206) can be used to extend the range of the link 222 between the first component 202 and the second component 208.

A link 222 incorporating one or more retimers (e.g., retimers 204, 206) can form two or more separate electrical sub-links at data rates comparable to data rates realized by links employing similar protocols but with no retimers. For instance, if link 222 included a single retimer, the link 222 could form a link with two separate sub-links, each operating at 8.0 GT/s or higher. As shown in FIG. 2, multiple retimers 204, 206 can be utilized to extend link 222. Three link segments 222, 224, and 226 can be defined through the two retimers 204, 206, with a first sublink 222 connecting the first component 202 to the first retimer 204, a second sublink 224 connecting the first retimer 204 to the second retimer 206, and the third sublink 226 connecting the second retimer 206 to the second component 208.

As shown in the example FIG. 2, in some implementations, a retimer can include two ports (or pseudo ports), and the ports can determine their respective downstream/upstream orientation dynamically. In embodiments, retimer 204 can include an upstream port 212 and a downstream port 214. Likewise, retimer 206 can include an upstream port 216 and a downstream port 218. Each retimer 204, 206 can have an upstream path and a downstream path. Further, retimers 204, 206 can support operating modes including a forwarding mode and an executing mode. A retimer 204, 206 in some instances can decode data received on the sub-link and re-encode the data that it is to forward downstream on its other sublink. As such, retimers may capture the received bit stream prior to regenerating and re-transmitting the bit stream to another device or even another retimer (or redriver or repeater). In some cases, the retimer can modify some values in the data it receives, such as when processing and forwarding ordered set data. Additionally, a retimer can potentially support any width option as its maximum width, such as a set of width options defined by a specification such as PCIe.

As data rates of serial interconnects (e.g., PCIe, UPI, USB, etc.) increase, retimers are increasingly used to extend the channel reach. Multiple retimers can be cascaded for even longer channel reach. It is expected that as signal speeds increase, channel reach will typically decrease as a general matter. Accordingly, as interconnect technologies accelerate, the use of retimers may become more common. As an example, as PCIe Gen-4, with its 16 GT/s, is adopted in favor of PCIe Gen-3 (8 GT/s), the use of retimers in PCIe interconnects may increase, as may be the case in other interconnects as speeds increase.

The downstream port 210 (e.g., in the first component 202, which can be an upstream component, such as a Root Complex or switch) is accessible to system software prior to link establishment or when the link 222 is unable to function properly. In embodiments, registers, such as the link capability registers, can be set to perform clock mode selection in the downstream port 210. System firmware/software can configure the downstream port 210 into the expected mode, and if a change is needed that this will be done by system firmware/software, rather than by hardware.

In embodiments, the link architecture 200 can include a controller hub 250. The controller hub 250 can be part of a root complex, central processing core, or other controller logic of a host system. The controller hub can include a system manager 252. The system manager 252 can be implemented in hardware circuitry and/or in software, such as by system management software embodied in a non-transitory computer-readable medium. For example, the system manager can be implemented as a software manager, hardware circuitry (e.g., protocol stack circuitry), firmware (e.g., of the data processor), or some combination of these. The system manager 252 can include a CIO connection manager, a PCIe connection manager, a USB connection manager, or other connection management logic that can build up and/or tear down connections of downstream devices that are connected across a multi-lane link (such as a link based on the PCIe, USB, or CIO protocols).

The system manager can use a register interface to configure the upstream and downstream lanes to set up an asymmetrical link interface between the host device (e.g., upstream device 202 and/or any intervening retimers 204, 206) and the downstream connected device (208). The system manager can use register information advertised by the downstream connected device 208 to determine whether the downstream connected device includes an interface port that can handle additional lanes of upstream or downstream traffic. Likewise, the system manager can use register information from retimers to determine whether any intervening retimers 204, 206 can support more than the standard number up uplink or downlink lanes. The upstream port 210 of the upstream component 202 should also be configured to support multiple upstream and/or downstream lanes to support asymmetrical interfaces. If all components include ports that can support asymmetrical interfaces, then the system manager can configure the ports and corresponding lanes to be in an asymmetric configuration (e.g., through a register interface on the upstream component 202, the downstream component 208, and any intervening retimers 204, 206).

In some embodiments, the system manager can use bandwidth topology information to dynamically adjust a number of upstream and/or downstream lanes to accommodate traffic flows for connected devices that will use more of one type of lane (e.g., upstream vs downstream). For example, a monitor may use more downstream lanes than upstream lanes, while a storage device or video camera may use more upstream lanes than downstream lanes. If the bandwidth is available on the lanes, then the system manager can switch the direction of one or more lanes of the multilane link to establish the asymmetric interface.

Figure 3A:
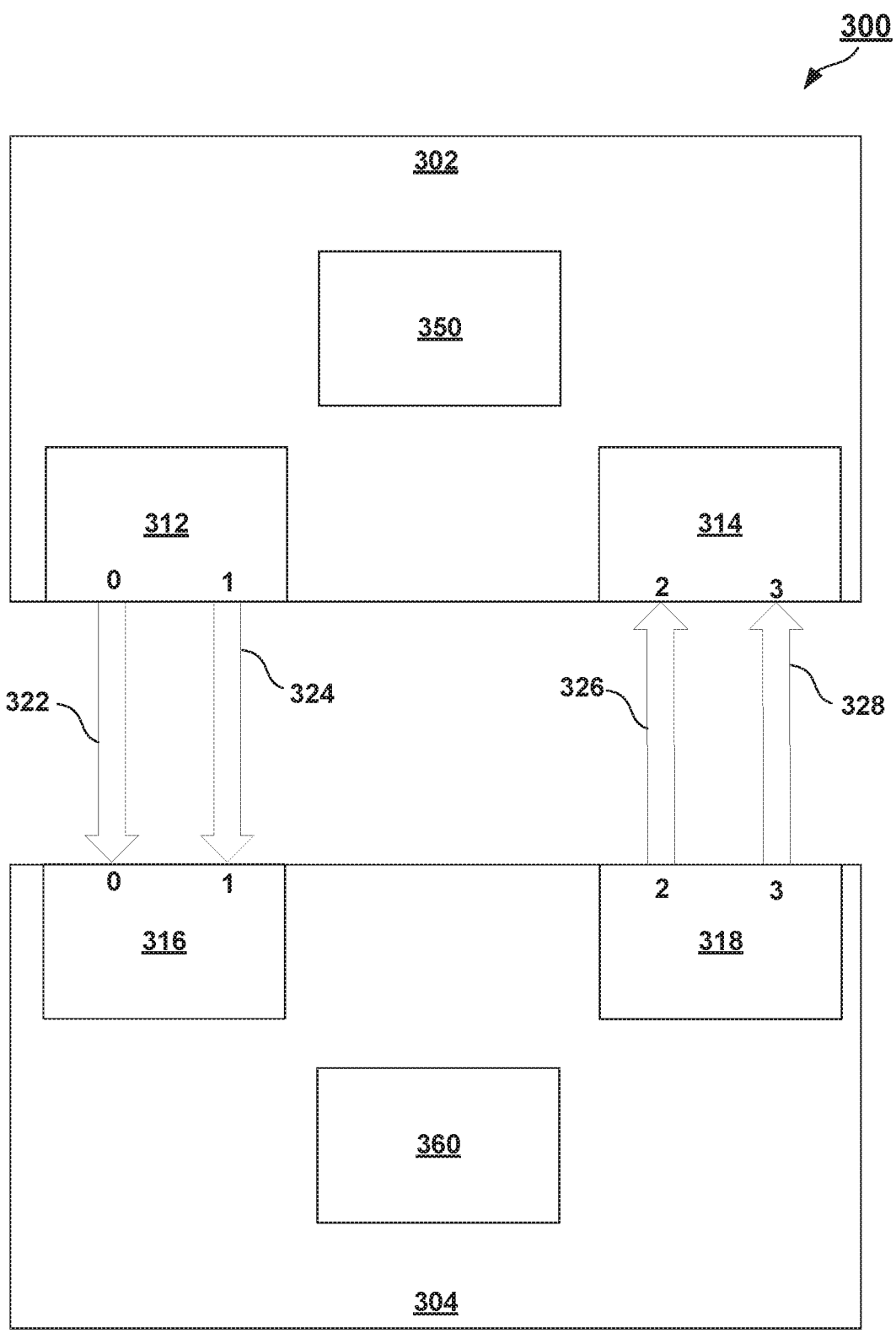
FIG. 3A is a schematic diagram of an example multi-lane interconnect architecture in accordance with embodiments of the present disclosure.
Figure 3B:
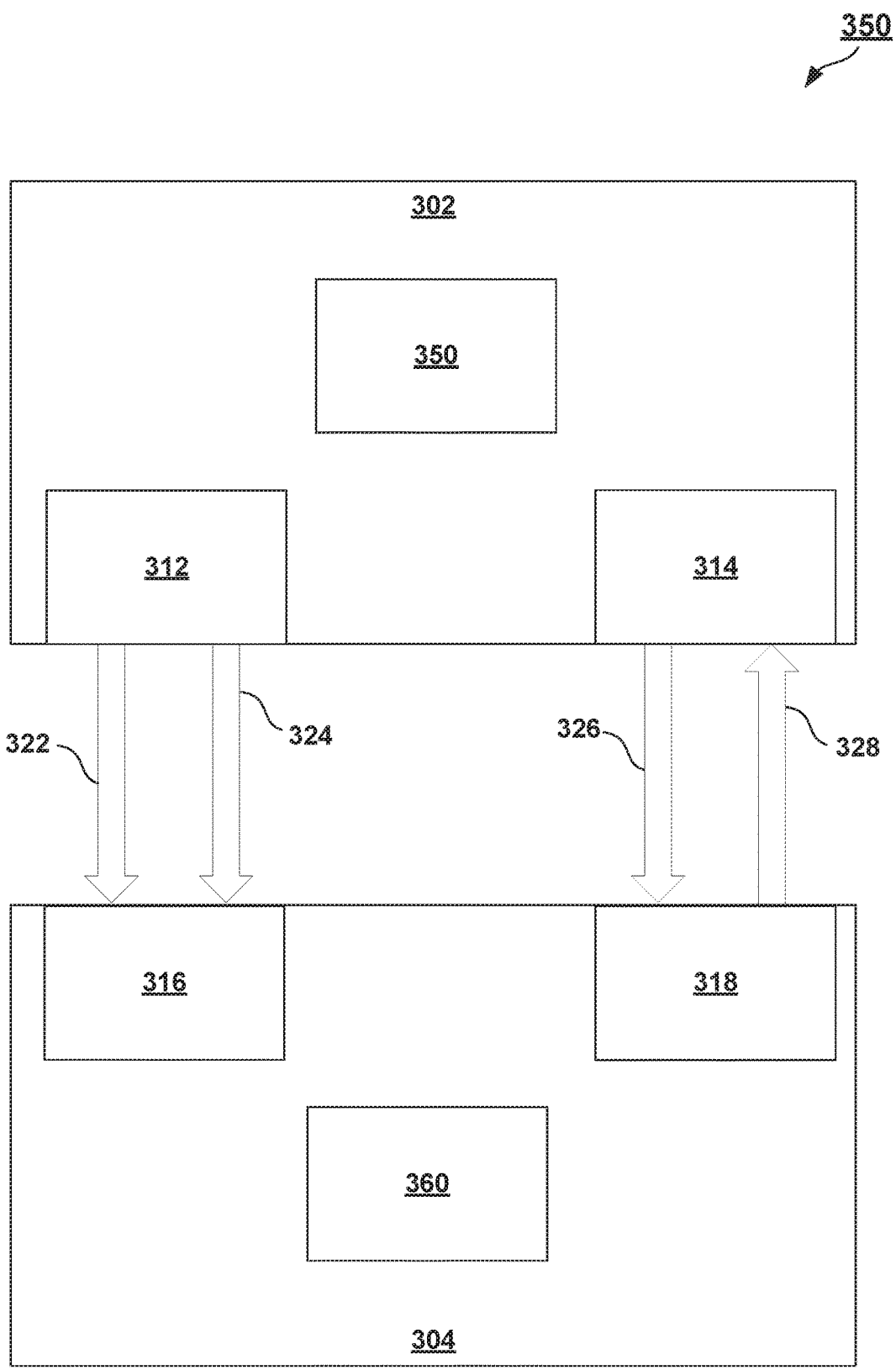
FIG. 3B is a schematic diagrams of example lane direction switching in accordance with embodiments of the present disclosure.

FIG. 3A is a schematic diagram of an example multi-lane interconnect architecture 300 in accordance with embodiments of the present disclosure. Thought the systems and methods described herein can be applied to any number of total or switching lanes, FIGS. 3A and 3B illustrate four lanes with one switched lane for explanation purposes. The multi-lane interconnect architecture 300 can include an upstream component 302. The upstream component 302 can be similar to upstream component 202 of FIG. 2. The upstream component 302 can include a first downstream port 312 and a first upstream port 314. The multi-lane interconnect architecture 300 can also include a downstream component 304. The downstream component 304 can be similar to downstream component 208. The downstream component 304 can include a second downstream port 316 and a second upstream port 318. The first downstream port 312 can be coupled to the second downstream port 316 by a downstream link that includes lane 0 and lane 1. The first upstream port 314 can be coupled to the second upstream port 318 by an upstream link that includes lane 2 and lane 3.

The first downstream port 312, the first upstream port 314, the second downstream port 316 port, and the second upstream port 318 can include logic circuitry and software that can support a switch in the traffic direction. For example, upstream component 302 can include a controller 350 that includes logic implemented in one or both of hardware or software for switching the direction of one or more lanes of the multi-lane interconnect architecture 300. The controller 350 can also control one or more ports to accommodate for the increase (or decrease) in data traffic. The downstream component 304 can also include a controller 360, that can be similar to controller 350, that includes logic implemented in one or both of hardware or software. Controller 360 can control one or more ports in the downstream component 304 to accommodate an increase or decrease in data traffic through the respective port(s).

The controller 350 can be or can include a system manager. The system manager can be, for example, a CIO connection manager, a PCIe connection manager, or other type of system management software for managing the link directions of the multi-lane interconnect architecture. The system management software can use one or more parameters to determine that the port(s) can accommodate the increase in data traffic entering or exiting a port. In addition, the system manager can use one or more parameters to determine that the connected components can benefit from asymmetrical lane configuration. The system manager can use register settings to indicate a change in the lane direction. For example, the system manager can set a register in the upstream component 302 and/or in the downstream component 304 to cause each component to recognize the change in a lane direction. The system manager can also determine whether a respective port can accommodate an increase in lane traffic. For example, a dedicated downstream port may not be able to accommodate any upstream traffic. The system manager can determine whether the ports can accommodate a lane direction switch prior to performing any dynamic lane direction switching.

The multi-lane link architecture 300 illustrates an example interface between two systems: upstream component 302 and downstream component 304. The interface includes two downstream lanes: first downstream lane 322 (lane 0) and second downstream lane 324 (lane 1). The interface also includes two upstream lanes: a first upstream lane 326 (lane 2) and a second upstream lane 328 (lane 3). FIG. 3B is a schematic diagram of example lane direction switching in accordance with embodiments of the present disclosure. In the example scenario illustrated in FIGS. 3A and 3B, the multi-lane link is dynamically switched between symmetrical mode to asymmetrical mode (where downstream lanes 322 and 324 remain downstream lanes, and upstream lane 328 remains an upstream lane, but where lane 2 326 becomes a downstream lane).

Lane switching can be determined based on a usage requirement. For example, lane switching can be triggered on a hot plug of a new device or new capability into the domain. The system manager can determine one or more running protocols could adhere to the new lane scheme. If the system manager determines that a new lane configuration could enable new capabilities and/or better utilization of the resources, it will trigger the lane switching. As mentioned previously, the system manager can build a connection with a new connected device (e.g., a hot plug connected device). The system manager can determine one or more parameters, such as bandwidth information, data directional biases (e.g., whether more data is to flow upstream versus downstream—an example of this is a connected monitor, which would benefit from more downstream lanes). The system manager can use system and/or device register settings to indicate the lane switching. For example, an on/off register setting can indicate the presence or absence of a lane switch. Other registers can also be used to indicate a number of lanes that are switched as well as the direction of the lane switch.

Figure 4:
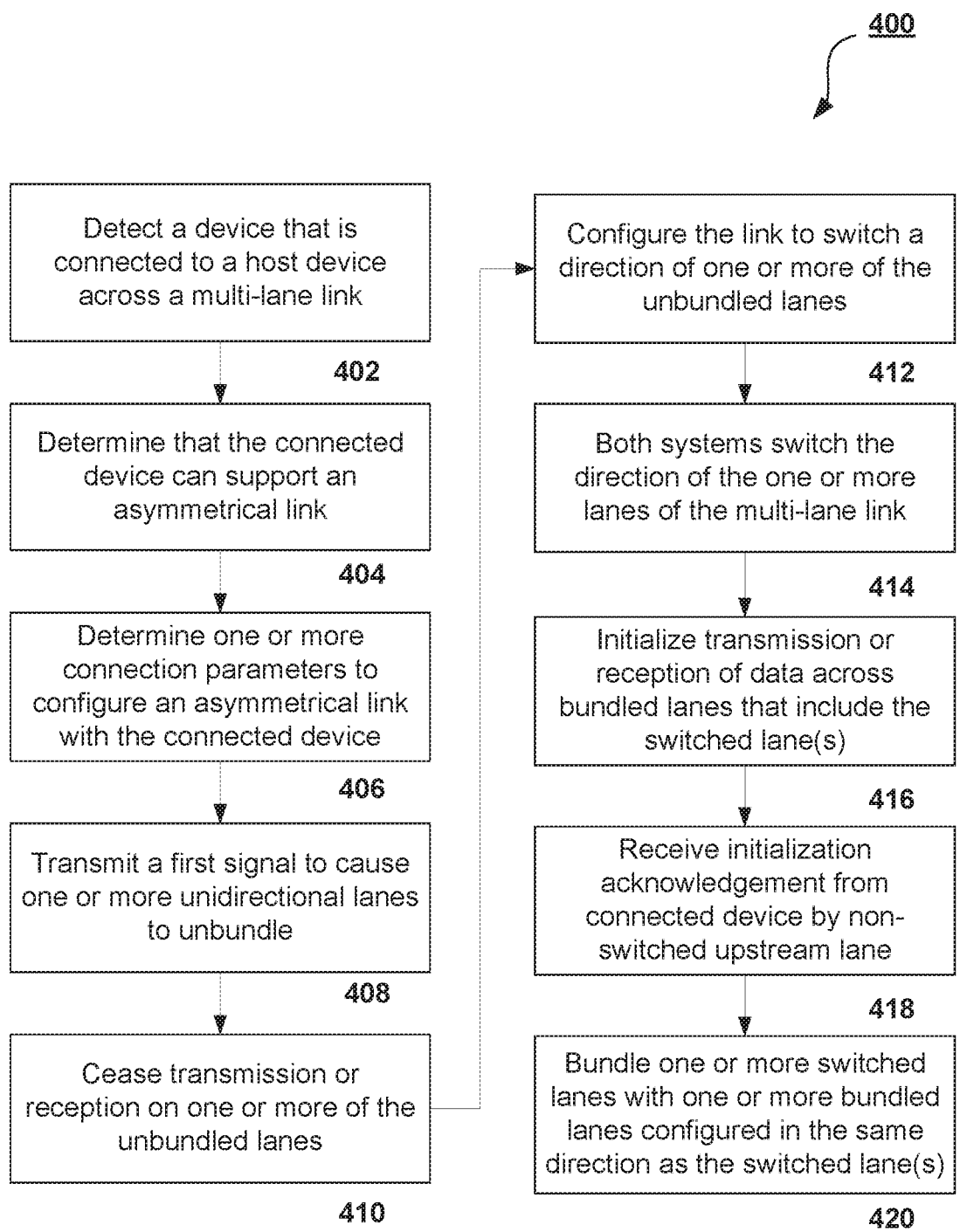
FIG. 4 is a process flow diagram for dynamic high speed lane direction switching in accordance with embodiments of the present disclosure.

FIG. 4 is a process flow diagram 400 for dynamic high speed lane direction switching in accordance with embodiments of the present disclosure. At the outset, a system manager tangibly embodied on the host device can detect the connection of a downstream or peripheral connected device connected to the host device (402). The host device can detect the downstream or peripheral connected device across a hot-plug or PCIe-based multi-lane link. In some embodiments, the host device can determine whether the downstream connected device can support multiple interconnect protocols, such as a multi-lane link that can include a PCIe link, a CIO link, a USB link, etc. The system manager logic can determine that the connected device can benefit from an asymmetrical lane configuration (404). For example, system manager can use bandwidth information, system usage requirements, system resource availabilities, asymmetrical lane support features of the connected device, as well as other parameters to determine that the protocols operating for the connected device can support or adhere to an asymmetrical lane configuration.

The system manager can determine one or more connection parameters to configure the asymmetrical link (406). For example, the system manager can determine a lane directionality bias for the connected device. If the device is a monitor, for example, the monitor may support an increase is a number of downstream lanes since the downstream bandwidth usage for monitors is larger than the upstream bandwidth usage. For a monitor, the system manager can cause one or more of the upstream lanes to switch to being one or more downstream lanes. The system manager can also determine a number of lanes to switch based on the bandwidth usage capabilities, the overall bandwidth availability of the link, the transmit and receive bandwidth capabilities of upstream and downstream ports that make up the interconnect, etc.

The system manager can cause the connected device to transmit a high-speed ordered set (UNBUNDLE_OS) to unbundle the identified lanes (408). The UNBUNDLE_OS can be transmitted on lanes that are to be unbundled. For example, in the case of a monitor, the monitor can unbundle the upstream lanes that are to be switched to downstream lanes. The system manager can cause the host device and the connected device to cease transmission or reception of data on the lanes that are unbundled (410). For example, in the case of a monitor, the monitor can cease transmitting on uplink lanes and the host device can cease receiving on uplink lanes.

The system manager can cause one or more lanes of the multi-lane link to switch directions (412). For the monitor example, the system manager can use register setting instructions to cause a register for the one or more lanes to set to a lane direction change. The register access can be an on/off register bit set at both the host device and the connected device. A register setting can be set for each lane of the multi-lane link that is to be directionally switched. The setting of the registers can establish a lane direction change for the one or more lanes (414).

The system manager can initialize transmission or reception of data across the one or more switched lanes (416). The system manager can perform connection set-up procedures, and other lane initialization steps to facilitate the use of the switched direction lanes for transmission or reception. The system manager can receive an acknowledgment of initialization of the switched lanes from the connected device (418). For example, the acknowledgement can be received on a lane that was not switched, such as a remaining unswitched upstream lane.

The system manager can receive a high speed ordered set (BUNDLE_OS) indicating that the switched lanes are to be bundled with other lanes that are in the same direction (420). The host device and the connected device can then use the multi-lane link for transmission and reception of data.

Figure 5:
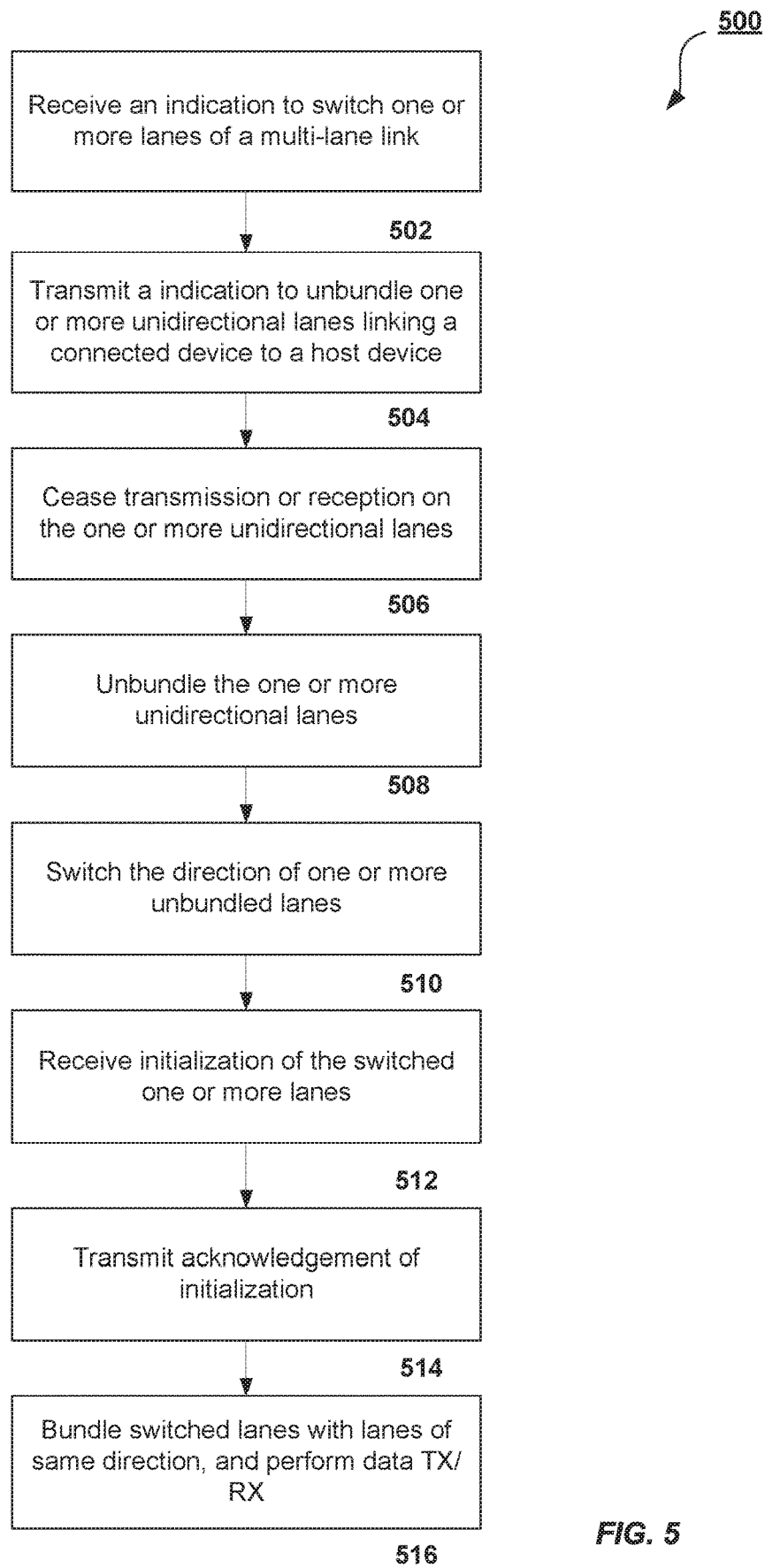
FIG. 5 is a process flow diagram for a connected device to switch one or more lanes of a multi-lane interconnect in accordance with embodiments of the present disclosure.

FIG. 5 is a process flow diagram 500 for a connected device to switch one or more lanes of a multi-lane interconnect in accordance with embodiments of the present disclosure. After being connected to a host device across a hot-plug or PCIE-based multi-lane link, the connected device can receive an instruction to switch the direction of one or more lanes of the multi-lane link (502). By way of example, the one or more lanes to be switched can be part of a first set of lanes configured to direct data in a first direction. The multi-lane link can also include a second set of lanes configured to direct data in a second direction, opposite the first direction. Transmitting to the host device a high-speed ordered set (UNBUNDLE_OS) to unbundle one or more unidirectional lanes linking a connected device to a host device (504). Ceasing use of the one or more lanes indicated for directional switching (506). The connected device can unbundle the all lanes of the first set of lanes (508). The connected device can receive an indication to change a direction of one or more of the unbundled lanes (510). For example, the connected device can receive an indication to change a register setting that controls the direction of the one or more lanes. The register setting can be a bit set, such as an on/off setting to cause the port coupled to the lane to change a direction of the data traffic (e.g., from transmit to receive or vice versa).

The one or more lanes that were switched can be initialized by the host device (512). The connected device can transmit an acknowledgement on an upstream lane (514). The connected device can receive a BUNDLE_OS high speed ordered set to bundle the switched lanes with the second set of lanes (516). The connected device and the host device can use the first and second sets of lanes for transmission and reception of data.

The foregoing disclosure has presented a number of example testing link states, which may supplement standard link states defined in an interconnect protocol. It should be appreciated that other testing link states may be provided in addition to those identified above without departing from the more generalized principles contained within this disclosure. For instance, while some of the example state machines and ordered sequences discussed herein were described with reference to PCIe or PCIe-based protocols, it should be appreciated that similar, corresponding enhancements may be made to other interconnect protocols, such OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others.

Note that the apparatus', methods', and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures. For instance, a host and device may be implemented, which are equipped with functionality to implement authentication and measurement architectures as discussed in the examples above, in any one of a variety of computing architectures (e.g., using any one of a variety of different interconnects or fabrics). For instance, a host may connect to a device supporting the authentication architecture within a personal computing system (e.g., implemented in a laptop, desktop, mobile, smartphone, Internet of Things (IoT) device, smart appliance, gaming console, media console, etc.). In another example, a host may connect to a device supporting the authentication architecture within a server computing system (e.g., a rack server, blade server, tower server, rack scale server architecture or other disaggregated server architecture), among other examples.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 6:
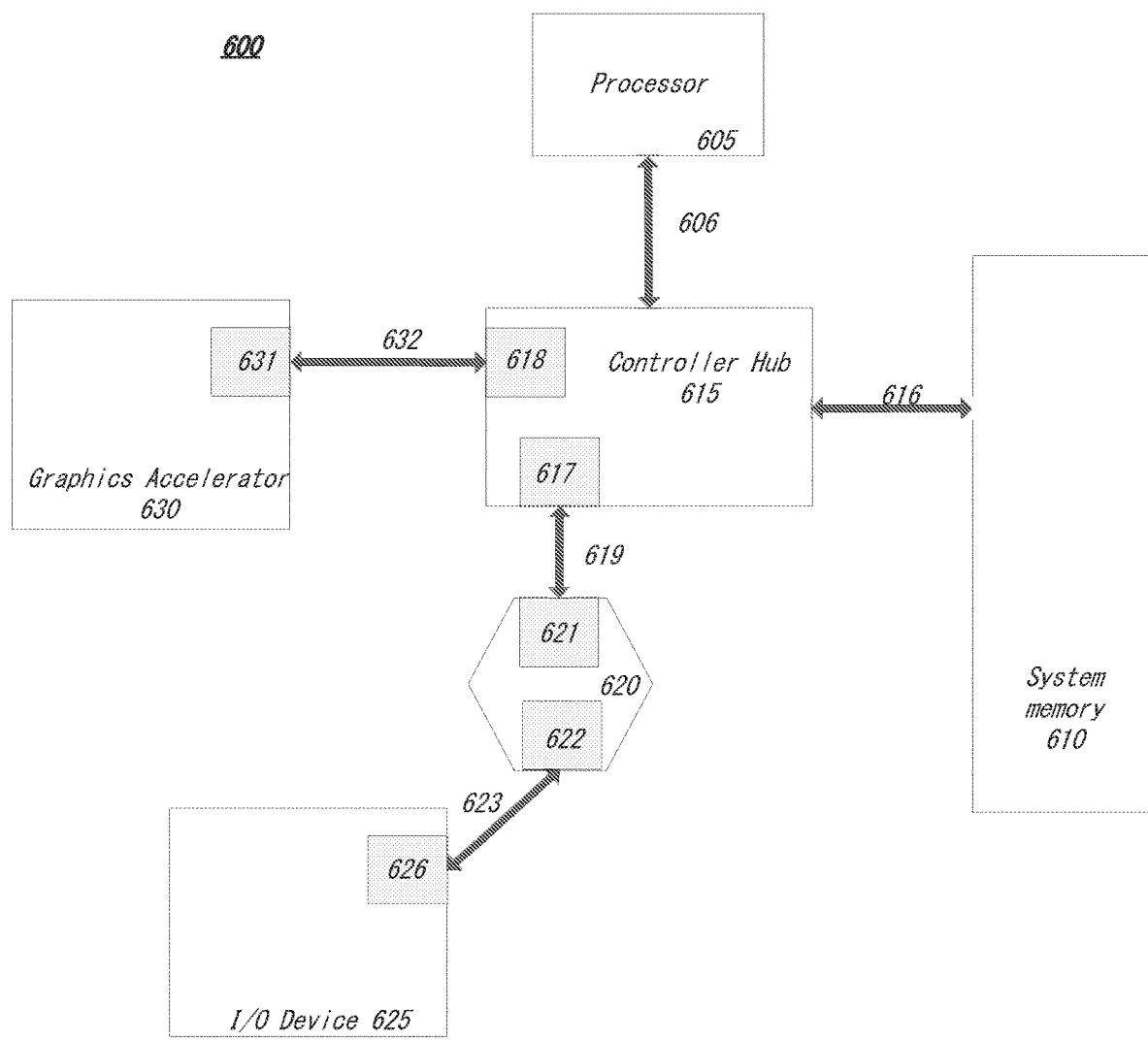
FIG. 6 illustrates an embodiment of a computing system including an interconnect architecture.

Referring to FIG. 6, an embodiment of a fabric composed of point-to-point Links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, link 606 includes a serial, differential interconnect architecture that is compliant with different interconnect standard.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a Peripheral Component Interconnect Express (PCIe or PCIE) interconnection hierarchy. Examples of controller hub 615 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex, to controller hub 615 and downstream, i.e. down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

Figure 7:
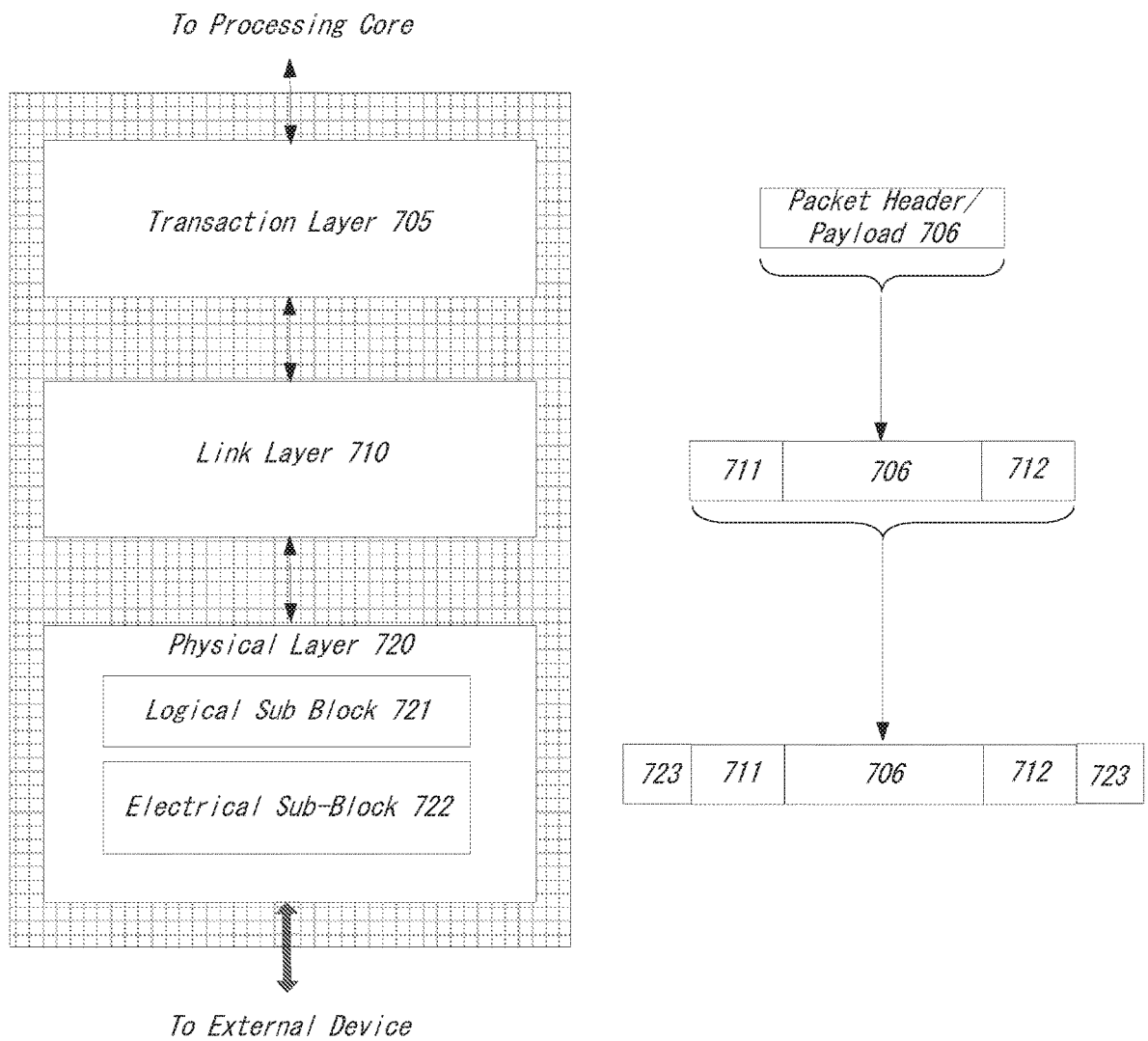
FIG. 7 illustrates an embodiment of a interconnect architecture including a layered stack.

Turning to FIG. 7 an embodiment of a layered protocol stack is illustrated. Layered protocol stack 700 includes any form of a layered communication stack, such as a Quick Path Interconnect (QPI) stack, a PCIe stack, a next generation high performance computing interconnect stack, or other layered stack. Although the discussion immediately below in reference to FIGS. 6-9 are in relation to a PCIe stack, the same concepts may be applied to other interconnect stacks. In one embodiment, protocol stack 700 is a PCIe protocol stack including transaction layer 705, link layer 710, and physical layer 720. An interface, such as interfaces 617, 618, 621, 622, 626, and 631 in FIG. 1, may be represented as communication protocol stack 700. Representation as a communication protocol stack may also be referred to as a module or interface implementing/including a protocol stack.

PCI Express uses packets to communicate information between components. Packets are formed in the Transaction Layer 705 and Data Link Layer 710 to carry the information from the transmitting component to the receiving component. As the transmitted packets flow through the other layers, they are extended with additional information necessary to handle packets at those layers. At the receiving side the reverse process occurs and packets get transformed from their Physical Layer 720 representation to the Data Link Layer 710 representation and finally (for Transaction Layer Packets) to the form that can be processed by the Transaction Layer 705 of the receiving device.

Transaction Layer

In one embodiment, transaction layer 705 is to provide an interface between a device's processing core and the interconnect architecture, such as data link layer 710 and physical layer 720. In this regard, a primary responsibility of the transaction layer 705 is the assembly and disassembly of packets (i.e., transaction layer packets, or TLPs). The translation layer 705 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 705. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 705 assembles packet header/payload 706. Format for current packet headers/payloads may be found in the PCIe specification at the PCIe specification website.

Figure 8:
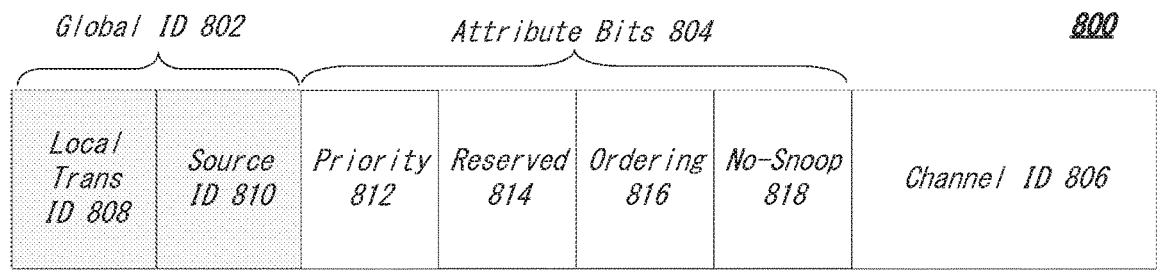
FIG. 8 illustrates an embodiment of a request or packet to be generated or received within an interconnect architecture.

Quickly referring to FIG. 8, an embodiment of a PCIe transaction descriptor is illustrated. In one embodiment, transaction descriptor 800 is a mechanism for carrying transaction information. In this regard, transaction descriptor 800 supports identification of transactions in a system. Other potential uses include tracking modifications of default transaction ordering and association of transaction with channels.

Transaction descriptor 800 includes global identifier field 802, attributes field 804 and channel identifier field 806. In the illustrated example, global identifier field 802 is depicted comprising local transaction identifier field 808 and source identifier field 810. In one embodiment, global transaction identifier 802 is unique for all outstanding requests.

According to one implementation, local transaction identifier field 808 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 810, local transaction identifier 808 field provides global identification of a transaction within a hierarchy domain.

Attributes field 804 specifies characteristics and relationships of the transaction. In this regard, attributes field 804 is potentially used to provide additional information that allows modification of the default handling of transactions. In one embodiment, attributes field 804 includes priority field 812, reserved field 814, ordering field 816, and no-snoop field 818. Here, priority sub-field 812 may be modified by an initiator to assign a priority to the transaction.

Reserved attribute field 814 is left reserved for future, or vendor-defined usage. Possible usage models using priority or security attributes may be implemented using the reserved attribute field.

In this example, ordering attribute field 816 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 818 is utilized to determine if transactions are snooped. As shown, channel ID Field 806 identifies a channel that a transaction is associated with.

Link Layer

Link layer 710, also referred to as data link layer 710, acts as an intermediate stage between transaction layer 705 and the physical layer 720. In one embodiment, a responsibility of the data link layer 710 is providing a reliable mechanism for exchanging Transaction Layer Packets (TLPs) between two components a link. One side of the Data Link Layer 710 accepts TLPs assembled by the Transaction Layer 705, applies packet sequence identifier 711, i.e. an identification number or packet number, calculates and applies an error detection code, i.e. CRC 712, and submits the modified TLPs to the Physical Layer 720 for transmission across a physical to an external device.

Physical Layer

In one embodiment, physical layer 720 includes logical sub block 721 and electrical sub-block 722 to physically transmit a packet to an external device. Here, logical sub-block 721 is responsible for the "digital" functions of Physical Layer 721. In this regard, the logical sub-block includes a transmit section to prepare outgoing information for transmission by physical sub-block 722, and a receiver section to identify and prepare received information before passing it to the Link Layer 710.

Physical block 722 includes a transmitter and a receiver. The transmitter is supplied by logical sub-block 721 with symbols, which the transmitter serializes and transmits onto to an external device. The receiver is supplied with serialized symbols from an external device and transforms the received signals into a bit-stream. The bit-stream is de-serialized and supplied to logical sub-block 721. In one embodiment, an 8b/10b transmission code is employed, where ten-bit symbols are transmitted/received. Here, special symbols are used to frame a packet with frames 723. In addition, in one example, the receiver also provides a symbol clock recovered from the incoming serial stream.

As stated above, although transaction layer 705, link layer 710, and physical layer 720 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 9:
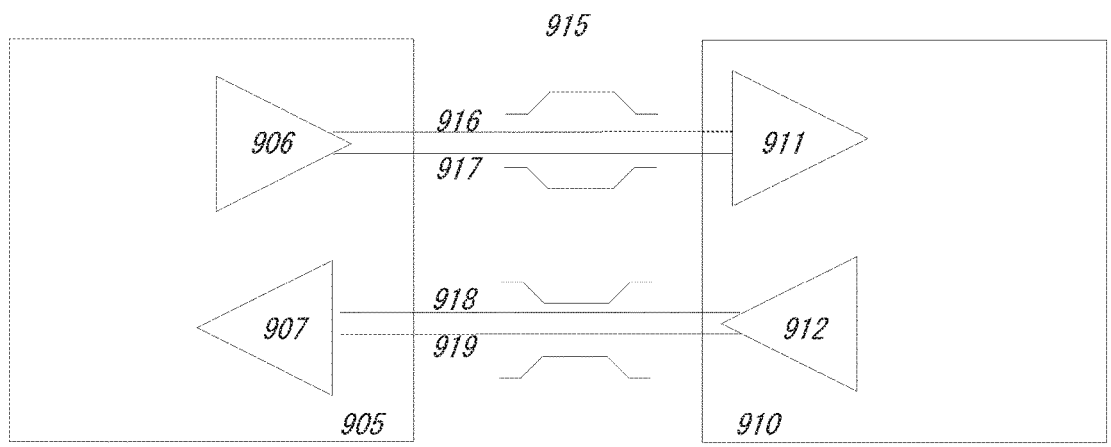
FIG. 9 illustrates an embodiment of a transmitter and receiver pair for an interconnect architecture.

Referring next to FIG. 9, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 906/911 and a receive pair 912/907. Accordingly, device 905 includes transmission logic 906 to transmit data to device 910 and receiving logic 907 to receive data from device 910. In other words, two transmitting paths, i.e. paths 916 and 917, and two receiving paths, i.e. paths 918 and 919, are included in a PCIe link.

A transmission path refers to any path for transmitting data, such as a transmission line, a copper line, an optical line, a wireless communication channel, an infrared communication link, or other communication path. A connection between two devices, such as device 905 and device 910, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 916 and 917, to transmit differential signals. As an example, when line 916 toggles from a low voltage level to a high voltage level, i.e. a rising edge, line 917 drives from a high logic level to a low logic level, i.e. a falling edge. Differential signals potentially demonstrate better electrical characteristics, such as better signal integrity, i.e. crosscoupling, voltage overshoot/undershoot, ringing, etc. This allows for better timing window, which enables faster transmission frequencies.

Figure 10:
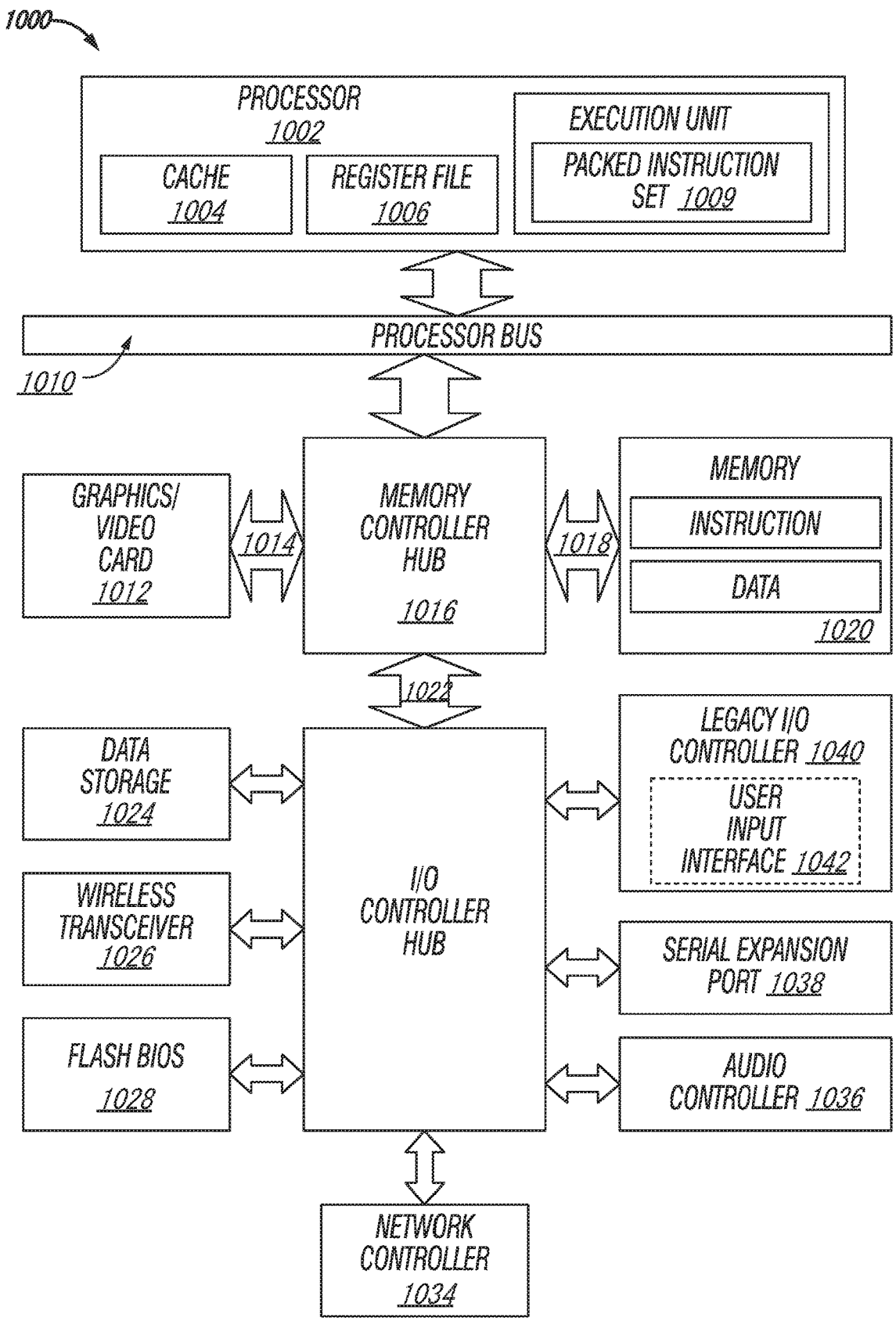
FIG. 10 illustrates another embodiment of a block diagram for a computing system including a processor.

Turning to FIG. 10, a block diagram of an exemplary computer system formed with a processor that includes execution units to execute an instruction, where one or more of the interconnects implement one or more features in accordance with one embodiment of the present disclosure is illustrated. System 1000 includes a component, such as a processor 1002 to employ execution units including logic to perform algorithms for process data, in accordance with the present disclosure, such as in the embodiment described herein. System 1000 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1000 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1002 includes one or more execution units 1008 to implement an algorithm that is to perform at least one instruction. One embodiment may be described in the context of a single processor desktop or server system, but alternative embodiments may be included in a multiprocessor system. System 1000 is an example of a 'hub' system architecture. The computer system 1000 includes a processor 1002 to process data signals. The processor 1002, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1002 is coupled to a processor bus 1010 that transmits data signals between the processor 1002 and other components in the system 1000. The elements of system 1000 (e.g. graphics accelerator 1012, memory controller hub 1016, memory 1020, I/O controller hub 1024, wireless transceiver 1026, Flash BIOS 1028, Network controller 1034, Audio controller 1036, Serial expansion port 1038, I/O controller 1040, etc.) perform their conventional functions that are well known to those familiar with the art.

In one embodiment, the processor 1002 includes a Level 1 (L1) internal cache memory 1004. Depending on the architecture, the processor 1002 may have a single internal cache or multiple levels of internal caches. Other embodiments include a combination of both internal and external caches depending on the particular implementation and needs. Register file 1006 is to store different types of data in various registers including integer registers, floating point registers, vector registers, banked registers, shadow registers, checkpoint registers, status registers, and instruction pointer register.

Execution unit 1008, including logic to perform integer and floating point operations, also resides in the processor 1002. The processor 1002, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1002. For one embodiment, execution unit 1008 includes logic to handle a packed instruction set 1009. By including the packed instruction set 1009 in the instruction set of a general-purpose processor 1002, along with associated circuitry to execute the instructions, the operations used by many multimedia applications may be performed using packed data in a general-purpose processor 1002. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1008 may also be used in micro controllers, embedded processors, graphics devices, DSPs, and other types of logic circuits. System 1000 includes a memory 1020. Memory 1020 includes a dynamic random access memory (DRAM) device, a static random access memory (SRAM) device, flash memory device, or other memory device. Memory 1020 stores instructions and/or data represented by data signals that are to be executed by the processor 1002.

Note that any of the aforementioned features or aspects of the disclosure may be utilized on one or more interconnect illustrated in FIG. 10. For example, an on-die interconnect (ODI), which is not shown, for coupling internal units of processor 1002 implements one or more aspects of the disclosure described above. Or the disclosure is associated with a processor bus 1010 (e.g. Intel Quick Path Interconnect (QPI) or other known high performance computing interconnect), a high bandwidth memory path 1018 to memory 1020, a point-to-point link to graphics accelerator 1012 (e.g. a Peripheral Component Interconnect express (PCIe) compliant fabric), a controller hub interconnect 1022, an I/O or other interconnect (e.g. USB, PCI, PCIe) for coupling the other illustrated components. Some examples of such components include the audio controller 1036, firmware hub (flash BIOS) 1028, wireless transceiver 1026, data storage 1024, legacy I/O controller 1010 containing user input and keyboard interfaces 1042, a serial expansion port 1038 such as Universal Serial Bus (USB), and a network controller 1034. The data storage device 1024 can comprise a hard disk drive, a floppy disk drive, a CD-ROM device, a flash memory device, or other mass storage device.

Figure 11:
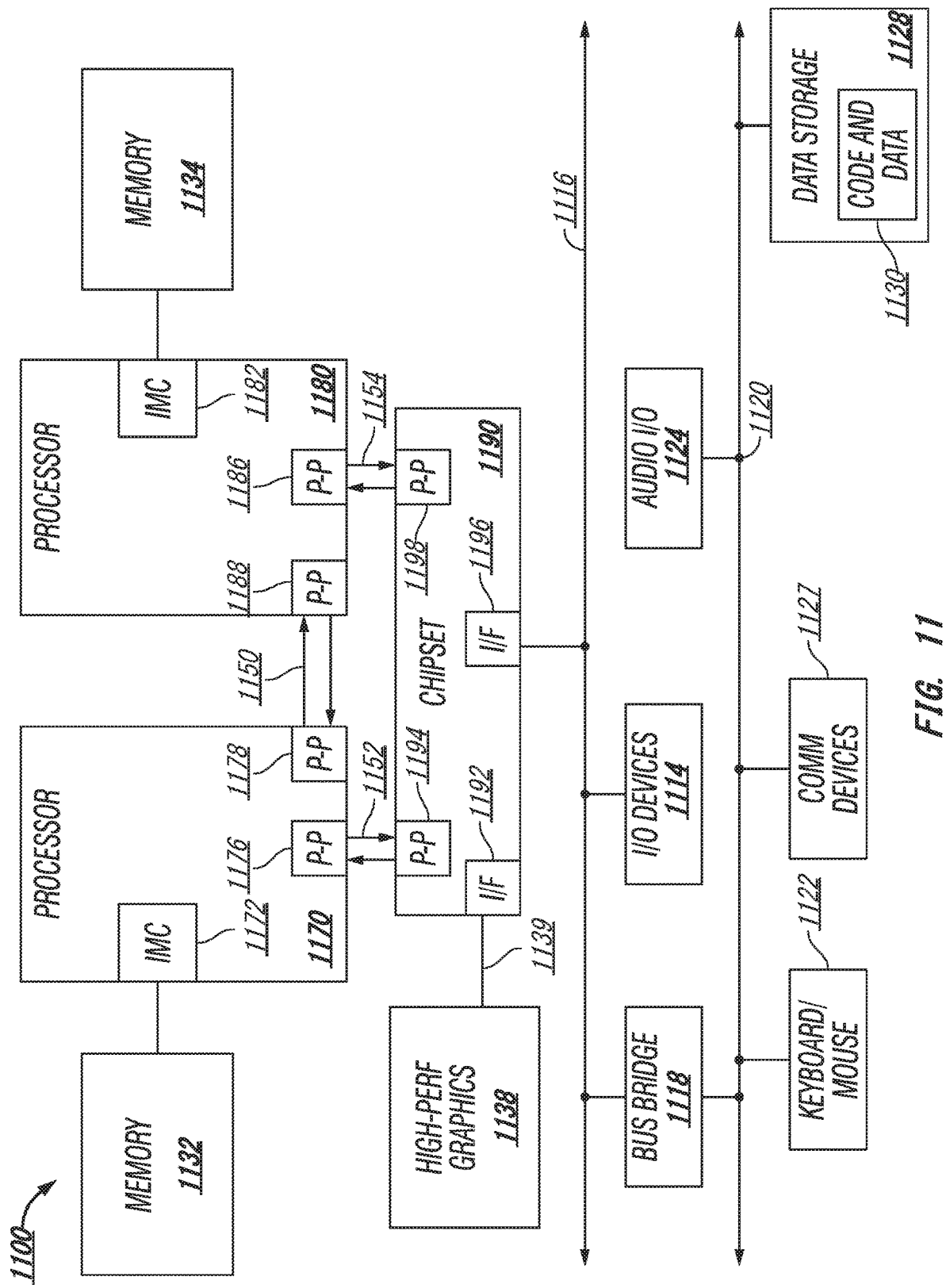
FIG. 11 illustrates an embodiment of a block for a computing system including multiple processor sockets.

Referring now to FIG. 11, shown is a block diagram of a second system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as Intel's Quick Path Interconnect (QPI) architecture. As a result, the disclosure may be implemented within the QPI architecture.

While shown with only two processors 1170, 1180, it is to be understood that the scope of the present disclosure is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, and 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The systems, methods, and apparatuses can include one or a combination of the following examples:

Example 1 is an apparatus for configuring a multi-lane link based on a Peripheral Component Interconnect express (PCIe) protocol, the multi-lane link comprising a first set of bundled lanes configured in a first direction and a second set of bundled lanes configured in a second direction, the second direction opposite the first direction, the first set of bundled lanes comprising an equal number of lanes as the second set of bundled lanes, the apparatus comprising link configuration logic to unbundle the first set of bundled lanes; switch a direction of one or more unbundled lanes from the first direction to the second direction; and bundle the switched one or more unbundled lanes with the second set of bundled lanes; and the apparatus to perform data transmission or reception on the second set of bundled lanes.

Example 2 may include the subject matter of example 1, the link configuration logic to determine that a device is connected across the multi-lane link; determine one or more system parameters for the device; and determine that the device can support lane direction switching.

Example 3 may include the subject matter of example 2, the link configuration logic to transmit an UNBUNDLE_OS signal to the device to cause the device to unbundle the first set of bundled lanes.

Example 4 may include the subject matter of any of examples 2-3, the link configuration logic to transmit a BUNDLE_OS signal to the device to bundle the switched one or more unbundled lanes with the second set of bundled lanes.

Example 5 may include the subject matter of example 2, wherein the one or more system parameters for the device comprises a bandwidth of the system, a data directional preference for the device, or a device configuration that supports an asymmetrical lane configuration.

Example 6 may include the subject matter of examples 2 or 5, wherein the one or more system parameters for the device comprise a determination that the connected device is a hot-plug capable device.

Example 7 may include the subject matter of example 2 or 5 or 6, wherein the one or more system parameters for the device comprise a determination that the use of an asymmetrical lane configuration increases the utilization of system resources.

Example 8 may include the subject matter of example 1, the link configuration logic to set a register setting to switch the direction of the one or more unbundled lanes.

Example 9 may include the subject matter of example 8, the link configuration logic to transmit a register setting instruction to cause a connected device to switch the direction of one or more lanes of the multi-lane link.

Example 10 may include the subject matter of example 1, wherein the apparatus comprises a root port controller to control one or more interconnect ports to switch the direction of one or more lanes of the multi-lane link.

Example 11 may include the subject matter of example 1, wherein the first set of bundled lanes configured in a first direction comprises a set of downstream lanes, the set of downstream lanes configured to direct data from the apparatus to a downstream connected device, and the second set of bundled lanes configured in a second direction comprises a set of upstream lanes, the set of upstream lanes configured to direct data to the apparatus from the downstream connected device.

Example 12 may include the subject matter of example 11, wherein the link configuration logic is to determine that the downstream connected device uses more downstream bandwidth than upstream bandwidth; determine that the downstream connected device can support a switching of one or more upstream lanes to one or more downstream lanes; and cause the downstream connected device to switch one or more upstream lanes to one or more downstream lanes; and the apparatus to transmit data on the switched one or more downstream lanes.

Example 13 may include the subject matter of example 11, wherein the link configuration logic is to determine that the downstream connected device uses more upstream bandwidth than downstream bandwidth; determine that the downstream connected device can support a switching of one or more downstream lanes to one or more upstream lanes; and cause the downstream connected device to switch one or more downstream lanes to one or more upstream lanes; and the apparatus to receive data on the switched one or more upstream lanes.

Example 14 is a computer program product tangibly embodied on non-transitory computer-readable media, the computer program product comprising instructions that when executed cause system manager embodied on a host device compatible with a Peripheral Component Interconnect Express (PCIe)-based protocol to detect a connection of a peripheral device across a multi-lane link compatible with the PCIe protocol; determine that the peripheral device benefits from an asymmetrical lane structure; switch a direction of one or more lanes to establish one or more switched lanes; and cause the host device and the peripheral device to transmit or receiving data on the one or more switched lanes.

Example 15 may include the subject matter of example 14, further comprising instructions to cause the system manager to identifying one or more lanes of the multi-lane link for direction switching; cease data transmission or reception on the identified one or more lanes for direction switching; unbundle the identified one or more lanes for direction switching from a first set of bundled lanes of the multi-lane link; switch a direction of the identified one or more lanes; and bundle the switched one or more lanes with a second set of lanes.

Example 16 may include the subject matter of example 15, wherein the system manager transmits a high speed ordered set UNBUNDLE_OS to the peripheral device to cause the peripheral device to unbundle the identified one or more lanes.

Example 17 may include the subject matter of example 15, wherein the system manager transmits a high speed ordered set BUNDLE_OS to the peripheral device to cause the peripheral device to bundle the identified one or more lanes with the second set of lanes.

Example 18 may include the subject matter of example 14, wherein the system manager is to determine that the peripheral device uses more downstream bandwidth than upstream bandwidth; determine that the peripheral device can support a switching of one or more upstream lanes to one or more downstream lanes; cause the peripheral device to switch one or more upstream lanes to one or more downstream lanes; and cause the host to transmit data on the switched one or more downstream lanes.

Example may include the subject matter of example 14, wherein the system manager is to determine that the downstream connected device uses more upstream bandwidth than downstream bandwidth; determine that the downstream connected device can support a switching of one or more downstream lanes to one or more upstream lanes; and cause the downstream connected device to switch one or more downstream lanes to one or more upstream lanes; and cause the host to receive data on the switched one or more upstream lanes.

Example 20 is a system comprising a host device comprising a root port compatible with a Peripheral Component Interconnect Express (PCIe)-based protocol, the host comprising system manager; and a component connected to the host device across a multi-lane link based on the PCIe protocol, the multi-lane link comprising a first set of bundled lanes configured to direct data in a first direction and a second set of bundled lanes configured to direct data in a second direction opposite the first direction, the first set of bundled lanes comprising an equal number of lanes as the second set of bundled lanes; the system manager to determine one or more operational parameters for the component; determine, based on the one or more operational parameters for the component, to switch one or more lanes from the first direction to the second direction; cause the host device to switch one or more lanes from the first direction to the second direction; and cause the host device to use the switched lanes with the second set of bundled lanes.

Example 21 may include the subject matter of example 20, wherein the first set of bundled lanes configured in a first direction comprises a set of downstream lanes, the set of downstream lanes configured to direct data from the apparatus to a downstream connected device, and the second set of bundled lanes configured in a second direction comprises a set of upstream lanes, the set of upstream lanes configured to direct data to the apparatus from the downstream connected device.

Example 22 may include the subject matter of example 21, wherein the system manager is to determine that the downstream connected device uses more downstream bandwidth than upstream bandwidth; determine that the downstream connected device can support a switching of one or more upstream lanes to one or more downstream lanes; and cause the downstream connected device to switch one or more upstream lanes to one or more downstream lanes; and the host device to transmit data on the switched one or more downstream lanes.

Example 23 may include the subject matter of example 22, wherein the component comprises one of a hot-plug compatible monitor, hot-plug compatible projector, hot-plug compatible audio device, or hot-plug compatible data storage device.

Example 24 may include the subject matter of example 21, wherein the system manager is to determine that the downstream connected device uses more upstream bandwidth than downstream bandwidth; determine that the downstream connected device can support a switching of one or more downstream lanes to one or more upstream lanes; and cause the downstream connected device to switch one or more downstream lanes to one or more upstream lanes; and the host device to receive data on the switched one or more upstream lanes.

Example 25 may include the subject matter of example 24, wherein the component comprises one of a hot-plug compatible camera.

Example 26 may include the subject matter of examples 1 or 14 or 20, wherein one of the link configuration logic or the system manager comprises a connection manager tangibly embodied on non-transient computer readable media.

Example 27 may include the subject matter of examples 1 or 14 or 20 or 26, wherein the PCIe-based protocol comprises a converged I/O protocol.

Example 28 is an apparatus that includes means for switching one or more lanes of a PCIe-based multi-lane link that connects a host device to a connected device.

Example 29 may include the subject matter of example 28, the apparatus comprising a means for determining one or more system parameters for the connected device, including directional bandwidth usage, and a means for switching a direction of one or more lanes of the multi-lane link based on the one or more system parameters.

Example 30 may include the subject matter of example 28, the apparatus comprising means for causing a host device and a connected device to unbundle a bundled set of lanes.

Example 31 may include the subject matter of examples 28 and 30, the apparatus comprising means for causing a host device and a connected device to bundle an unbundled set of lanes with one or more lanes that the apparatus caused to switch directions.

Example 32 is an apparatus compliant with a hot-plug or PCIe protocol, the apparatus comprising controller logic to receive an instruction from a host device across a hot-plug or PCIe-based multi-lane link, to switch one or more lanes of an interconnect port from a first direction to a second direction, unbundle the lanes of the port, switch one or more lanes from a first direction to the second direction, bundle the lanes of the port, and use the switched lanes for data transmission or reception.

Example 33 is a method performed by a connection manager of a PCIe-based host device, the method includes determining that a downstream connected device can be enhanced by an asymmetrical lane configuration. The connection manager can instruct the connected device to switch a direction of one or more lanes of the multi-lane link. The connection manager can cause the connected device to send a High-Speed Ordered Set (UNBUNDLE_OS) on all lanes used for one of transmission or reception.

Example 34 may include the subject matter of example 33, and can also include receiving an UNBUNDLE_OS ordered set and based on receiving the UNBUNDLE_OS, activating or deactivating transmission or reception of one or more lanes of the multi-lane link.

Example 35 may include the subject matter of example 33, the connection manager can switch the direction of one or more lanes of the multi-lane link using register accesses at both the host device and the connected device.

Example 36 may include the subject matter of example 35, the connection manager can initialize the switched one or more lanes to operate in a direction opposite that previously configured.

Example 37 may include the subject matter of example 36, the connection manager can receive a lane initialization message from the connected device on a lane of the multi-lane link that is not switched.

Example 38 may include the subject matter of examples 33-37, the connection manager can transmit a High-Speed Ordered Set (BUNDLE_OS) on all lanes for transmission to the connected device.

Example 39 is a downstream connected device that is connected to a host device across a multi-lane link that is compatible with a PCIe-based protocol, such as a CIO or USB protocol. The downstream connected device can receive an indication from the host device to switch a direction of one or more lanes of the multi-lane link. The downstream connected device can transmit a high-speed ordered set (UNBUNDLE_OS) to the host device to unbundle one or more unidirectional lanes of the multi-lane link. The downstream connected device can cease using one or more lanes of the multi-lane link. The register setting for the lanes to be switched can be set so that the lanes directions are switched.

Example 40 may include the subject matter of example 39, the downstream connected device can acknowledge initialization of one or more lanes of the multi-lane link to be used in an opposite direction. The initialization is prompted by the host device. The downstream connected device can use an unswitched lane of the multi-lane link to transmit the acknowledgement.

Example 41 may include the subject matter of examples 39 or 40, the downstream connected device can receive a high speed ordered set (UNBUNDLE_OS) to bundle the switched lanes with other lanes of the same direction. The downstream connected device can then use the lanes for transmission or reception.

Example 42 may include the subject matter of any of examples 1-40, the system manager or link configuration manager to perform a register access at one or both of the one or more ports or the device for a register that controls a polarity of one or more lanes coupled to the one or more ports; and write a register value to the register to reverse the polarity of the subset of lanes. The register access can include setting a bit associated with a that controls the polarity of the lanes.

Example 43 is an apparatus that includes a means for determining a presence of a downstream connected device across a multi-lane link; a means for determining that the downstream connected device can operate under an asymmetrical link configuration; a means for causing a set of lanes of the multi-lane link to change polarity; and a means for communicating data with the downstream connected device across the set of lanes.

Example 44 is a device comprising a port for communicating data across a multi-lane link; a memory register for storing register settings, the register settings comprising one or more register values that control a polarity of each lane of the multi-lane link; a means for indicating that the device can operate under an asymmetrical link configuration; and a means for changing the register settings for one or more lanes of the multi-lane link to switch a direction of the one or more lanes.

Example 45 is a method comprising determining a presence of a downstream connected device across a multi-lane link; determining that the downstream connected device can operate under an asymmetrical link configuration; causing a set of lanes of the multi-lane link to change polarity; and communicating data with the downstream connected device across the set of lanes.

Example 46 may include the subject matter of example 45 and can also include causing one or more lanes of the multi-lane link to become unbundled; switching the polarity of a subset of lanes of the multi-lane link; and causing the subset of lanes to be bundled.

Example 47 may include the subject matter of example 46, wherein the multi-lane link comprising a first set of lanes in a first direction and second set of lanes in a second direction, the second direction opposite the first direction, and the method comprising unbundling the first set of lanes, switching the polarity of a subset of the first set of lanes, and bundling the subset of lanes with the second set of lanes.

Example 48 may include the subject matter of example 46, and can also include determining to switch a direction of one or more lanes of the multi-lane link based, at least in part, on one or more system operating parameters, the system operating parameters comprising one or more of wherein the one or more system parameters comprise a bandwidth of the system, a data directional preference for the peripheral device, a device configuration that supports an asymmetrical lane configuration, a determination that the peripheral device is a hot-plug capable device, or a determination that a use of an asymmetrical lane configuration increases efficiency of system resource utilization.

What is claimed is:

1. An apparatus for configuring a multi-lane link, the apparatus comprising:
    one or more ports comprising hardware to support the multi-lane link, wherein the multi-lane link comprises a first set of bundled lanes configured in a first direction and a second set of bundled lanes configured in a second direction, the second direction is opposite to the first direction, the first set of bundled lanes comprises an equal number of lanes as the second set of bundled lanes, the apparatus comprising:
    link configuration logic, implemented at least in part in hardware circuitry, to:
        determine one or more operational parameters for the multi-lane link before completion of initialization of the multi-lane link, wherein the one or more operational parameters comprise a data directional bias indicative of whether more data is to flow upstream or downstream on the multi-lane link;
        cause the first set of bundled lanes to be unbundled based on the data directional bias;
        switch a direction of a subset of unbundled lanes from the first direction to the second direction based on the data directional bias; and
        bundle the switched subset of unbundled lanes with the second set of bundled lanes to form a reduced first set of bundled lanes in the first direction and an expanded second set of bundled lanes in the second direction, wherein the reduced first set of bundled lanes comprises at least two lanes;
    the one or more ports are to use the reduced first set of bundled lanes and the expanded second set of bundled lanes for transmission and reception of data.

2. The apparatus of claim 1, wherein the one or more ports comprise one or both of a Peripheral Component Interconnect Express (PCIe)-based port or a hot-plug-based port.

3. The apparatus of claim 2, wherein the one or more ports comprise one or both of a converged input/output (CIO) or universal serial bus (USB)-based port.

4. The apparatus of claim 1, wherein the first set of bundled lanes configured in a first direction comprises a set of downstream lanes, the set of downstream lanes configured to direct data from the apparatus to a downstream connected device, and the second set of bundled lanes configured in a second direction comprises a set of upstream lanes, the set of upstream lanes configured to direct data to the apparatus from the downstream connected device.

5. The apparatus of claim 4, wherein the link configuration logic is to:
    determine that the downstream connected device uses more downstream bandwidth than upstream bandwidth;
    determine that the downstream connected device can support a switching of a subset of upstream lanes to a subset of downstream lanes; and
    cause the downstream connected device to switch the subset of upstream lanes to the subset of downstream lanes; and
    the apparatus to transmit data on the switched subset of downstream lanes.

6. The apparatus of claim 4, wherein the link configuration logic is to:
    determine that the downstream connected device uses more upstream bandwidth than downstream bandwidth;
    determine that the downstream connected device can support a switching of a subset of downstream lanes to a subset of upstream lanes; and
    cause the downstream connected device to switch the subset of downstream lanes to the subset of upstream lanes; and
    the apparatus to receive data on the switched subset of upstream lanes.

7. The apparatus of claim 1, the link configuration logic to cause an unbundle ordered set to unbundle the first set of bundled lanes, the unbundle ordered set transmitted across the first set of bundled lanes.

8. The apparatus of claim 1, the link configuration logic to cause a bundle ordered set to bundle the switched subset of lanes with the second set of lanes.

9. The apparatus of claim 1, the link configuration logic to perform a register access of a register associated with the one or more ports that control a polarity of one or more lanes coupled to the one or more ports; and write a register value to the register to reverse the polarity of the subset of lanes.

10. At least one non-transitory machine accessible storage medium having instructions stored thereon, the instructions when executed on a machine, cause the machine to:

detect a connection of a peripheral device to a host device across a multi-lane link, wherein the multi-lane link is originally provisioned with a symmetrical lane structure;

determine one or more system parameters for the peripheral device;

determine that the peripheral device can support lane direction switching;

determine that the peripheral device benefits from an asymmetrical lane structure;

identify a subset of lanes for direction switching;

cause the peripheral device to transmit an ordered set to cause the peripheral device and the host device to participate in unbundling of the subset of lanes, wherein the ordered set indicates a request to unbundle the subset of lanes, wherein the ordered set comprises an UNBUNDLE_OS ordered set, wherein to cause the peripheral device to transmit the ordered set comprises to cause the UNBUNDLE_OS ordered set to be transmitted on each lane that is to be unbundled;

switch a direction of the subset of lanes in the multi-lane link to establish a subset of switched lanes to convert the multi-lane link to the asymmetrical lane structure; and cause the host device and the peripheral device to transmit and receive data on the multi-lane link with the asymmetrical lane structure.

11. The at least one non-transitory machine accessible storage medium of claim 10, wherein the instructions cause the machine, when executed, to cause an additional ordered set to be transmitted to cause the host device and the peripheral device to participate in bundling of the switched subset of lanes with a second set of bundled lanes.

12. The at least one non-transitory machine accessible storage medium of claim 11, wherein the additional ordered set comprises a BUNDLE_OS ordered set, and wherein the instructions cause the machine, when executed, to cause the BUNDLE_OS ordered set to be transmitted on the subset of unbundled lanes.

13. The at least one non-transitory machine accessible storage medium of claim 10, wherein the one or more system parameters for the peripheral device comprise a data directional preference for the peripheral device.

14. The at least one non-transitory machine accessible storage medium of claim 10, wherein the one or more system parameters for the peripheral device comprise a determination that the peripheral device is a hot-plug capable device.

15. The at least one non-transitory machine accessible storage medium of claim 10, wherein the one or more system parameters for the peripheral device comprise a determination that a use of an asymmetrical lane configuration increases efficiency of system resource utilization.

16. The at least one non-transitory machine accessible storage medium of claim 10, wherein the instructions cause the machine, when executed, to:

perform a register access at one or more ports for a register that controls a polarity of one or more lanes coupled to the one or more ports; and write a register value to the register to reverse the polarity of the subset of lanes.

17. A system comprising:

a host comprising a data processor and a system manager; and a device connected to the host across a multi-lane link, the multi-lane link comprising a first set of bundled lanes configured to direct data in a first direction and a second set of bundled lanes configured to direct data in a second direction opposite the first direction, the first set of bundled lanes comprising an equal number of lanes as the second set of bundled lanes;

wherein the system manager is to:

determine one or more operational parameters for the device before completion of initialization of the multi-lane link with the device, wherein the one or more operational parameters comprise a data directional bias indicative of whether more data is to flow upstream or downstream on the multi-lane link;

determine, based on the data directional bias, to switch one or more lanes from the first direction to the second direction;

cause the host to switch one or more lanes from the first direction to the second direction; and cause the host to use the switched lanes with the second set of bundled lanes to direct data in the second direction and to use a remaining plurality of lanes in the first set of bundled lanes to direct data in the first direction.

18. The system of claim 17, wherein the first set of bundled lanes configured in a first direction comprises a set of downstream lanes, the set of downstream lanes configured to direct data from the host to a downstream connected device, and the second set of bundled lanes configured in a second direction comprises a set of upstream lanes, the set of upstream lanes configured to direct data to the host from the downstream connected device.

19. The system of claim 18, wherein the system manager is to:

determine that the downstream connected device uses more downstream bandwidth than upstream bandwidth;

determine that the downstream connected device can support a switching of subset of upstream lanes to subset of downstream lanes; and cause the downstream connected device to switch subset of upstream lanes to subset of downstream lanes; and the host to transmit data on the switched subset of downstream lanes.

20. The system of claim 19, wherein the device comprises one of a hot-plug compatible monitor, hot-plug compatible projector, hot-plug compatible audio device, hot-plug capable docking station, or hot-plug compatible data storage device.

21. The system of claim 18, wherein the system manager is to:

determine that the downstream connected device uses more upstream bandwidth than downstream bandwidth;

determine that the downstream connected device can support a switching of subset of downstream lanes to subset of upstream lanes; and cause the downstream connected device to switch subset of downstream lanes to subset of upstream lanes; and the host to receive data on the switched subset of upstream lanes.

22. The system of claim 21, wherein the device comprises one of a hot-plug compatible camera.

23. The apparatus of claim 1, wherein the link configuration logic is to determine the data directional bias based on a type of a device connected to the multi-lane link.

* * * * *